(12) United States Patent
Bristow et al.

(10) Patent No.: US 7,283,256 B2
(45) Date of Patent: Oct. 16, 2007

(54) METHOD AND APPARATUS FOR MEASURING WAFER THICKNESS

(75) Inventors: Thomas C. Bristow, Rochester, NY (US); Shu W. Wang, Rochester, NY (US); John E. Stephan, Rochester, NY (US)

(73) Assignee: Chapman Instruments, Inc., Rochester, NY (US)

( * ) Notice: Subject to any disclaimer, the term of this patent is extended or adjusted under 35 U.S.C. 154(b) by 0 days.

(21) Appl. No.: 11/388,316

(22) Filed: Mar. 24, 2006

(65) Prior Publication Data

US 2006/0181715 A1  Aug. 17, 2006

Related U.S. Application Data

(63) Continuation-in-part of application No. 10/946,450, filed on Sep. 21, 2004.

(51) Int. Cl.
*G01B 11/28* (2006.01)
(52) U.S. Cl. ...................................................... 356/630
(58) Field of Classification Search ........ 356/600–603, 356/609, 614, 630–637; 250/201.4, 559.27, 250/559.28
See application file for complete search history.

(56) References Cited

U.S. PATENT DOCUMENTS

| | | | | |
|---|---|---|---|---|
| 3,994,589 A | * | 11/1976 | Nodwell et al. | 356/623 |
| 4,201,475 A | * | 5/1980 | Bodlaj | 356/631 |
| 4,564,296 A | * | 1/1986 | Oshida et al. | 356/630 |
| 5,351,126 A | * | 9/1994 | Takada et al. | 356/602 |
| 5,907,396 A | * | 5/1999 | Komatsu et al. | 356/237.1 |
| 6,111,649 A | * | 8/2000 | Tominaga et al. | 356/630 |
| 7,119,351 B2 | * | 10/2006 | Woelki | 250/559.4 |

* cited by examiner

*Primary Examiner*—Sang H. Nguyen
(74) *Attorney, Agent, or Firm*—Neal L. Slifkin; Robert C. Brown

(57) ABSTRACT

A system for non-contact measurement of thickness of a test object. A laser beam is split into two identical directly opposed input beams. A calibration object of known thickness causes beams to be reflected from sides of the test object. Each reflected beam passes through sensing means including a pinhole aperture and a photodiode sensor. Maximum sensor output defines first and second focal points a known distance apart. The calibration object is removed, and the test object is inserted into the path of the input beams, creating focus position intensity curves for the reflected beams. By determining the deviation, at maximum photodiode output, of the positions of the test object reflecting surfaces from the positions of the calibration object surfaces, the test object thickness can be readily and accurately determined.

6 Claims, 2 Drawing Sheets

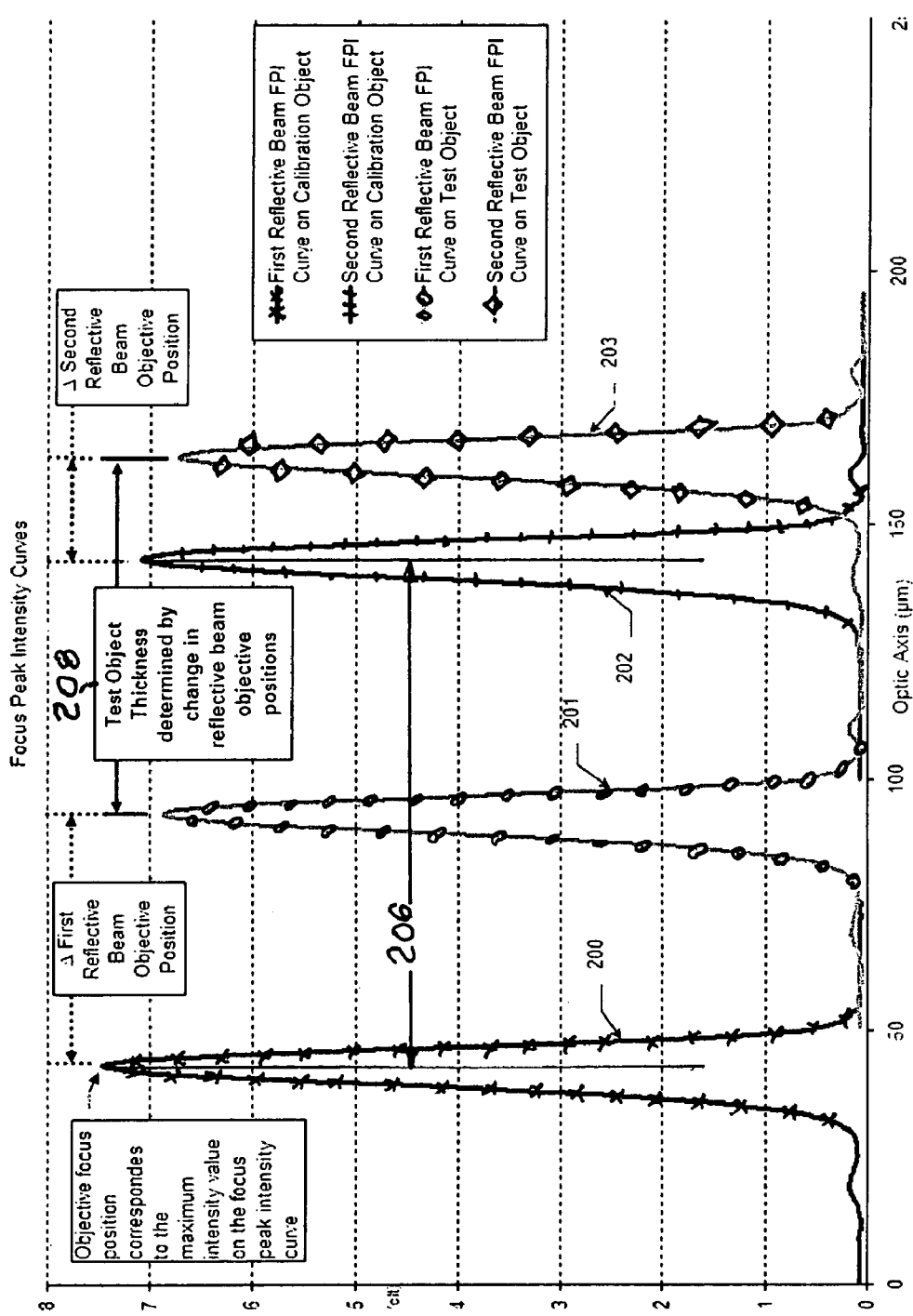

METHOD AND APPARATUS FOR MEASURING WAFER THICKNESS

The present application is a Continuation-In-Part of a pending U.S. patent application Ser. No. 10/946,450, filed Sep. 21, 2004.

TECHNICAL FIELD

The present invention relates to means for measuring thickness of objects; more particularly, to method and apparatus for non-contact measurement of thickness; and most particularly, to method and apparatus for non-contact measuring the thickness of a planar reflective object such as a silicon wafer or a flat panel display.

BACKGROUND OF THE INVENTION

Silicon wafers are important elements of the semiconductor industry. Such wafers typically are sawn from artificially-grown silicon crystals and require one or more surface finishing or conditioning operations, each of which causes progressive thinning of a wafer.

The semiconductor industry is moving toward thinner wafers, especially important for smart cards, flash memory, and other products requiring thin packaging. One of the challenges for thin wafer manufacturing is uniformity of thickness after backgrind. A system is needed for accurate measurement of wafer thickness, preferably a non-contact system. Such a system may also be useful for measuring thickness of other semiconductor elements such as bare silicon wafers, flat panel displays, and MEMS.

A wafer starts at a thickness of approximately 0.8 mm and provides the building block for all of the processing leading to a wide range of electronic memory products. A finished wafer moves to a "backend" facility, which may be another plant in a different country. In the so-called backend segment of the semiconductor industry, the wafer goes through a back-grinding process wherein material is removed from the wafer backside by grinding the back surface. Currently, the wafer thickness after backgrinding is typically between about 0.1 mm and about 0.3 mm, depending upon the final application.

The factory segment of the industry consists of thinning, dicing, and packaging chips cut from the wafer.

There are at least two prior art methods and apparatus for non-contact measurement of thickness after backgrind of a finished wafer.

Systems employing capacitative sensors, for example, are available from ADE Technologies, Inc. (Westwood, Mass.) and Mechanical Technologies, Inc. (Albany, N.Y.). This technology has been used in measuring thickness of bare and patterned wafers. A known problem in applying this technology to wafers having chips formed on their surfaces is that the capacitative sensor can be confused by the signal from the chip and the wafer due to metal and/or other materials in the chip. Also, the capacitative technique can be influenced by a protective tape used to protect the wafer front surface.

Systems employing an optical type measurement are available from Frontier Semiconductor Measurements, Inc. (San Jose, Calif. Their system relies on measuring the interference of two beams from the top and bottom (after transmission through the part) surfaces. A known problem with this technology is that the spatial resolution can be relatively low, leading to confusion and overlap between a chip and another nearby feature on the wafer. Another problem is that the thickness measurement is dependent on knowing the index of refraction of the material.

What is needed in the art is a non-contact means for measuring the thickness of a test object, and especially of a chip-bearing silicon wafer after backgrind, wherein the thickness measurement is highly accurate, wherein spatial resolution along the surface of the object is very high, and wherein the means is not affected by metallic or non-silicon components of a wafer.

It is a principal object of the present invention to provide high-resolution, high-accuracy thickness measurement of a test object.

SUMMARY OF THE INVENTION

Briefly described, a system in accordance with the invention for non-contact measurement of thickness of a test object employs a generator for creating a light beam, preferably a laser beam. The beam is split into two identical input beams that are directed conventionally by mirrors and beam splitters through adjustable focusing objectives such that the two input beams are directly opposed, defining a test space for receiving an object to be measured. A calibration object of known thickness, for example, an optical flat having approximately the thickness of a test object to be subsequently measured, when inserted into the test space causes first and second reflected beams to be reflected from first and second sides of the calibration object. Each reflected beam is diverted through one or more pinholes onto a photodiode sensor. The adjustable objectives are moved along the optic axis such that the focal point for each beam is moved through its respective calibration object surface, generating a Focus Peak Intensity Curve response in each photodiode sensor. Thus the position of each objective is known at which the surface of the calibration object is in focus. The calibration object is removed, and the system is ready for measurement of the thickness of an object such as a silicon wafer.

The test object is inserted into the path of the input beams, creating thereby first and second focus peak intensity curves for the first and second reflected beams. The beams are moved through on the test object surfaces by moving the objectives along the optic axis, focus being defined by maximum response of the photodiode sensors. The distances and directions the first and second objectives are moved are additive measures of the difference in thickness of the test object with respect to the calibration object, which is of known thickness. Thus the actual thickness of the test object is derived.

An important advantage of the present system is that a very small focused spot may be used, on the order of about 1 μm. When means are provided to translate the test object orthogonal to the beams, the wafer thickness can be readily measured to a very high degree of resolution in the presence of surface features. This can be very useful, for example, in characterizing so-called "bump wafers" which have small bumps all over the wafer for interconnect. This is a relatively new concept and is being used at present by some advanced fabricators. The bumps presently have diameters and spacings on the order of 100 μm, and the industry goal will be to reduce both. It is important to know what the base thickness of the wafer is in between the bumps. Prior art systems having relatively large optical focus spots are not suitable for bump wafer analysis. However, a system in accordance with the invention can scan across a wafer and can readily determine the base thickness of the wafer between the bumps.

BRIEF DESCRIPTION OF THE DRAWINGS

The present invention will now be described, by way of example, with reference to the accompanying drawings, in which:

FIG. 2 is a graph of focus peak intensity curves of the first and second beams reflected from a calibration object and from a test object.

DESCRIPTION OF THE PREFERRED EMBODIMENTS

Figure 1:
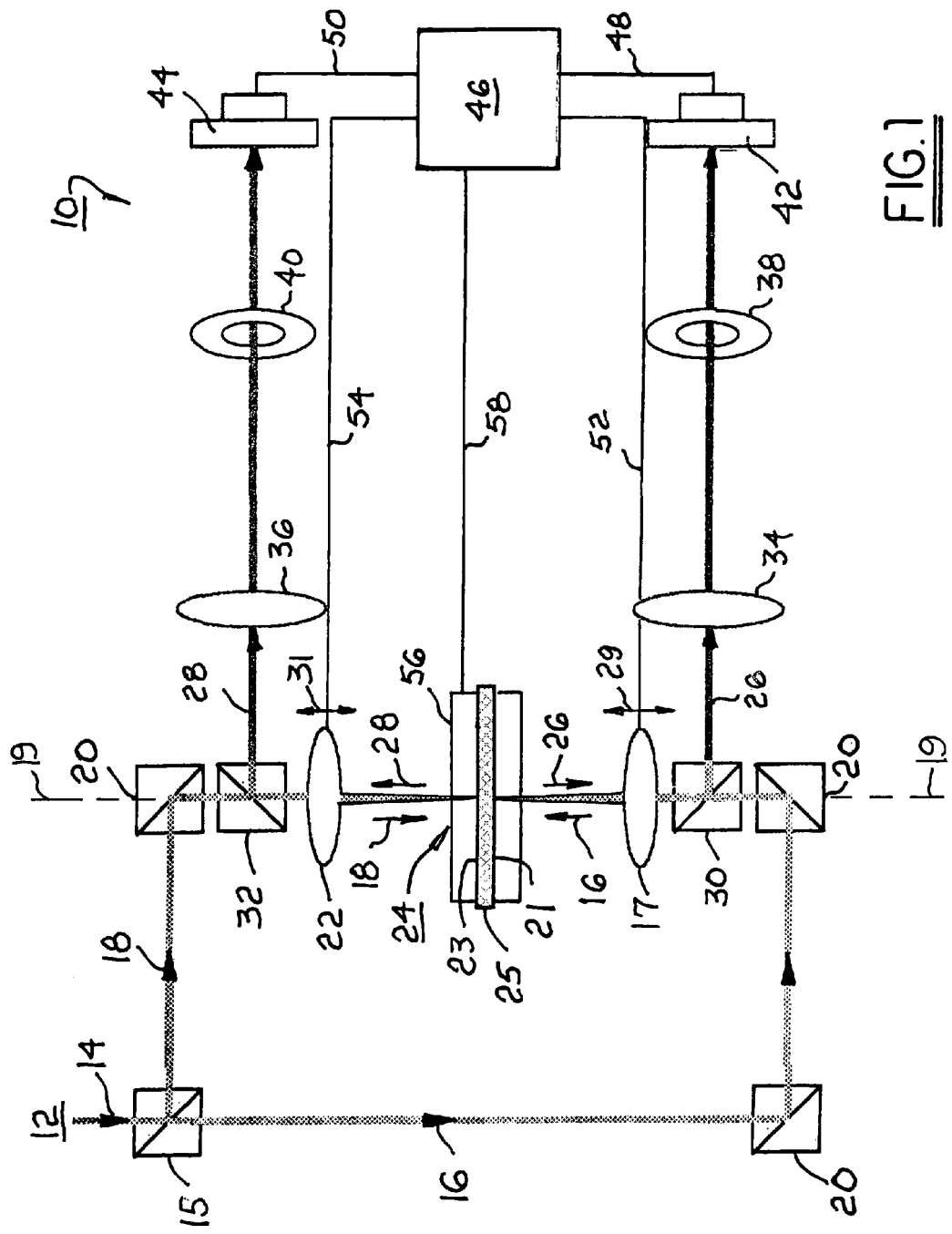
FIG. 1 is a schematic drawing showing a system in accordance with the invention for measuring thickness of an object.

Referring to FIG. 1, a non-contact thickness measurement system 10 in accordance with the invention includes a light-generating source 12 capable of producing a master beam 14. Beam 14 may be incoherent but preferably is a laser beam. A first beam splitter 15 divides master beam 14 into first and second input beams 16,18 which preferably are substantially identical in intensity. Angled mirrors 20 turn beams 16,18 such that they are in opposition along an optic axis 19. First and second focusing means 17,22 are provided for focusing input beams 16,18 independently in a space 24 between focusing means 17 and 22. Focusing means 17,22 are independently movable 29,31 along optic axis 19 to vary the axial positions of their respective focal points within space 24. When reflective surfaces 21,23 of a test object 25 are placed in space 24, first and second reflective beams 26,28 from surfaces 21,23 are turned by half-mirrors 30,32, respectively, to direct reflective beams 26,28 through first and second lens 34,36, first and second pinhole apertures 38,40, and onto first and second photodiode sensors 42,44, respectively. A programmable control means 46, preferably a computer, receives input signals 48,50 from photodiode sensors 42,44 indicative of the focus state of input beams 16,18 with respect to surfaces 21,23. Control means 46 sends output signals 52,54 to focusing means 17,22 to adjust the axial position thereof along axis 19 until maximum signals are produced in sensors 42,44. The distances and directions the focusing means 17,22 are moved along axis 19 (from previously-established calibration positions using a calibration object of know thickness) are additive measures of the difference in thickness of the test object with respect to the calibration object. Thus the actual thickness of the test object is easily derived.

Preferably, a conventional multi-axis stage 56 is provided in space 24 for mounting of object 25 and positioning object 25 in response to signals 58 from control means 46.

Referring now to FIGS. 1 and 2, Focus Peak Intensity Curves 200, 201, 202 and 203 as are generated for each photodiode sensor 42,44, show diode voltage intensity as a function of displacement of either of focusing means 17 or 22 along axis 19.

In a method in accordance with the invention for determining the thickness of a test object, system 10 is first calibrated. A calibration object 25 is positioned as shown in FIG. 1. The calibration object is preferably a reference flat having plane parallel reflective surfaces 21,23. The thickness of the calibration object 25 is selected to approximate the estimated thickness of the test object. The objective power in focusing means 17,22 is also selected, based in part upon the topographic range to be measured in the test object and in part upon the accuracy required, as discussed above.

Autofocus means in system 10 senses the degree of focus in photodiode sensors 42,44. By manually moving focusing means 17,22 until a maximum signal is received from the photodiodes, input beams 16,18 are now in focus on surfaces 21,23, respectively at first and second focal spots separated by a distance equal to the thickness of the calibration object, for example, 100 μm. This represented by the distance between the peaks of focus peak intensity curves 200 and 202 in FIG. 2. The autofocus is then disabled, such that input beams remain in fixed focus on the first and second focal spots in space. The calibration object is removed.

To measure the thickness of a test object, the test object is installed on stage 56 and positioned such that areas of surfaces 21,23 predetermined for measurement are positioned for impingement of input beams 16,18. Because the focus of each beam 16,18 is now fixed, each photodiode 42,44 generates a focus peak intensity curve directly indicative of the distance, either positive or negative, of each surface 21,23 from the fixed focal (calibration) points on optic axis 19. The distances may be determined as described above by unlocking the focus elements and moving each focus element 17,22 along axis 19 until each element reaches a position providing maximum voltage in photodiodes 42,44. These positions are represented by the peaks of focus peak intensity curves 201,203 in FIG. 2. The measured distances along axis 19 are added to (positive distances) or subtracted from (negative distances) the calibration distance 206 between the focal points, representing the thickness of the calibration object. Thus, the thickness 208 of the test object is obtained.

System 10 is especially useful in characterizing the thickness of objects of varying thickness, for example, a "bump" wafer having a gross wafer thickness at the peak of each bump and a net wafer thickness in the valleys between the bumps. Wafer 25 may be moved by control means 46 along a programmed path orthogonal to optic axis 19. Because the size of each focal spot is small relative to the topography, the peak wafer thickness and valley wafer thickness may be readily determined.

Similarly, the amount of wafer bow created by backgrinding can be readily measured, using either on or both of the optical systems within system 10 and scanning the wafer orthogonally to optic axis 19 (z axis) in mutually orthogonal directions (x and y axes) (not shown).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for measuring the thickness of an object having first and second surfaces, comprising the steps of:
    a) providing first and second opposed light beams;
    b) providing first and second focus error determining means for said first and second opposed light beams;
    c) focusing said first and second opposed light beams at first and second focal points in space along an optic axis;
    d) determining the distance between said first and second focal points in space;
    e) inserting said object into said first and second opposed light beams such that said beams impinge on said first and second surfaces, respectively;
    f) passing first and second beams reflected from said first and second surfaces, respectively, through respective pinhole apertures;
    g) impinging said first and second reflected beams on respective first and second photodiode sensors;
    h) varying focus on said first and second surfaces by varying respective focal points along said optic axis to determine respective first and second maximum photodiode sensor outputs and corresponding distances of said respective focal points at said maxima; and
    g) applying said first and second distances to said distance determined between said first and second focal points in space to obtain the thickness of said object between said first and second surfaces.

2. A method in accordance with claim 1 wherein said first and second light beams are laser light beams.

3. A method in accordance with claim 1 wherein said object is selected from the group consisting of silicon wafer, flat panel display, and MEMS.

4. A method in accordance with claim 1 wherein said step of focusing said first and second opposed light beams at first and second focal points in space and said step of determining the distance between said first and second focal points in space comprise the steps of:
    a) inserting a calibration object into said first and second beams, said calibration object having a known thickness between first and second calibration surfaces thereof; and
    b) focusing said first and second beams onto said first and second calibration surfaces to define said first and second focal points in space along an optic axis orthogonal to and passing through said calibration surfaces, the space between said first and second focal points being said known thickness of said calibration object.

5. A system for measuring thickness of an object having first and second surfaces, comprising:
    a) means for generating first and second opposed light beams for impinging on said first and second surfaces, respectively;
    b) means for selectively focusing each of said first and second light beams;
    c) means for determining a focus peak intensity curve for each of said first and second light beams as reflected from said first and second surfaces, respectively, wherein said means includes at least one pinhole aperture and at least one photodiode; and
    d) computational means for processing said first and second focus peak intensity curves to determine object thickness,
    wherein said computational means includes a computer having an algorithm for determining the locations of said first and second surfaces along said first and second beams as a function of said first and second focus peak intensity curves, and for applying said locations of said focus peak intensity curves to a reference distance between two reference points along said beams to determine said object thickness.

6. An apparatus in accordance with claim 5 wherein said first and second light beams are laser light beams.

* * * * *